United States Patent [19]
Kröll et al.

[11] Patent Number: 5,931,617
[45] Date of Patent: Aug. 3, 1999

[54] AUTOMATIC LOAD SECURING DEVICE FOR CONTAINERS, INTERCHANGEABLE CONTAINERS OR THE LIKE

[75] Inventors: Joachim Kröll, Jüchen; Hermann Franzen, Mönchengladbach, both of Germany

[73] Assignee: Mannesmann Aktiengesellschaft, Düsseldorf, Germany

[21] Appl. No.: 08/927,622

[22] Filed: Sep. 11, 1997

[30] Foreign Application Priority Data

Sep. 12, 1996 [DE] Germany ............................ 196 38 963

[51] Int. Cl.⁶ ...................................................... B60P 7/08
[52] U.S. Cl. .................................. 410/91; 410/72; 410/77; 410/94; 410/83
[58] Field of Search ................................... 410/77, 80, 82, 410/81, 83, 54, 72, 73, 76, 90, 91, 94; 248/500, 503, 681; 280/DIG. 8, 406.1

[56] References Cited

U.S. PATENT DOCUMENTS

| | | | |
|---|---|---|---|
| 1,303,854 | 5/1919 | Clark | 410/80 X |
| 2,021,503 | 11/1935 | Fildes | 410/72 |
| 3,296,981 | 1/1967 | Bergstrand | 410/76 |
| 3,354,838 | 11/1967 | Mowatt-Larssen | 410/73 |
| 3,431,017 | 3/1969 | Joseph | 410/80 |
| 3,507,224 | 4/1970 | Sweger | 410/83 |
| 3,507,226 | 4/1970 | Nadherny | 410/83 |
| 4,834,321 | 5/1989 | Granger | 410/77 X |

FOREIGN PATENT DOCUMENTS

| | | | |
|---|---|---|---|
| 555 111 A1 | 8/1993 | European Pat. Off. | 410/83 |
| 2 315 442 | 1/1977 | France . | |
| 1 906 826 | 2/1969 | Germany . | |
| 24 22 477 | 12/1974 | Germany | 248/500 |
| 27 47 778 | 4/1979 | Germany . | |
| 43 15 974 A1 | 5/1983 | Germany . | |
| 195 48 803 C1 | 12/1995 | Germany . | |
| 196 10 374A1 | 9/1996 | Germany | 410/77 |

*Primary Examiner*—Stephen T. Gordon
*Attorney, Agent, or Firm*—Cohen, Pontani, Leiberman & Pavane

[57] ABSTRACT

The invention is directed to a load securing device for standardized transport vessels, such as containers, interchangeable containers or the like, on loading surfaces by securing pins which are swivelable upward from a rest position under the loading surface around a horizontal swiveling axle arranged below the latter into their vertical working position and which are lockable in this position so as to be retained in openings in the corner regions of the transported goods. For this purpose, a swivel bearing plate is arranged in the manner of a one-armed lever between securing pins and the swivel axle so as to be mounted thereon, the securing pins being fastened to the swivel bearing plate at a distance laterally from the swivel axle. A locking pin is guided in a lockable manner at the swivel bearing plate so as to be displaceable transversely to the swivel axle and parallel to the swivel bearing plate, this locking pin being displaceable by a piston cylinder unit which can swivel the swivel bearing plate into its working position and rest position and thereby locks the swivel bearing plate.

6 Claims, 6 Drawing Sheets

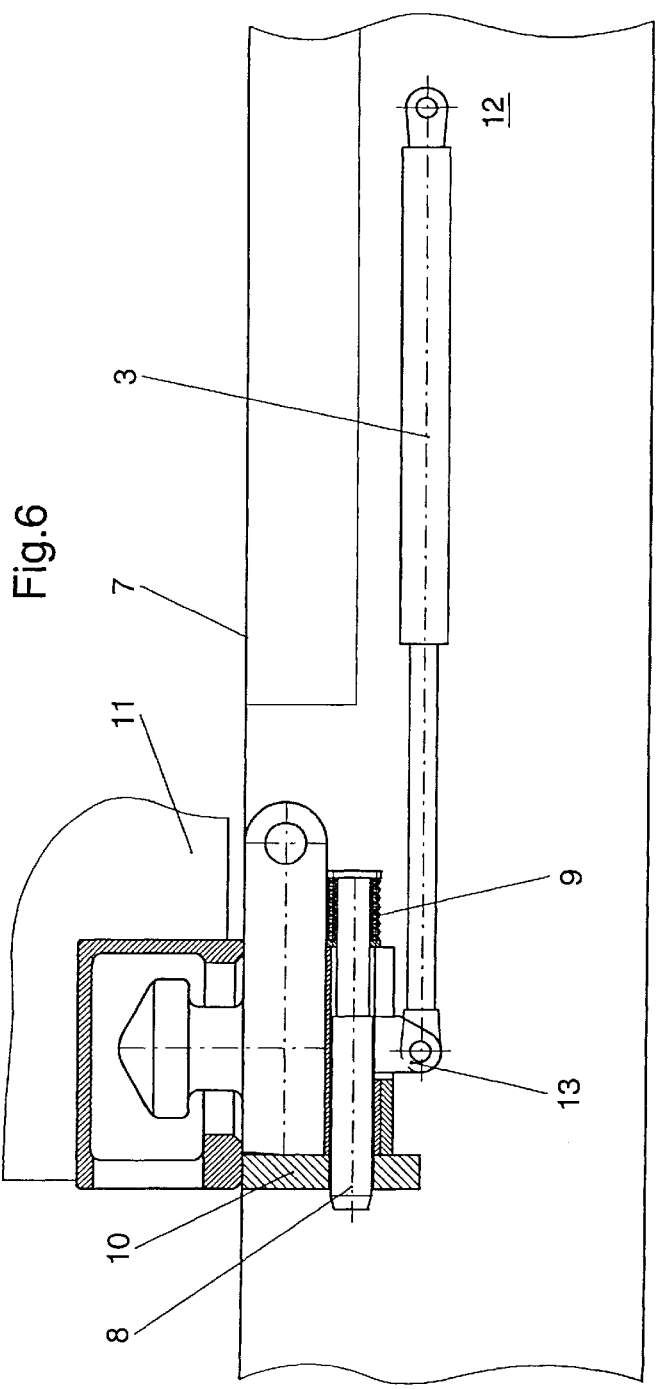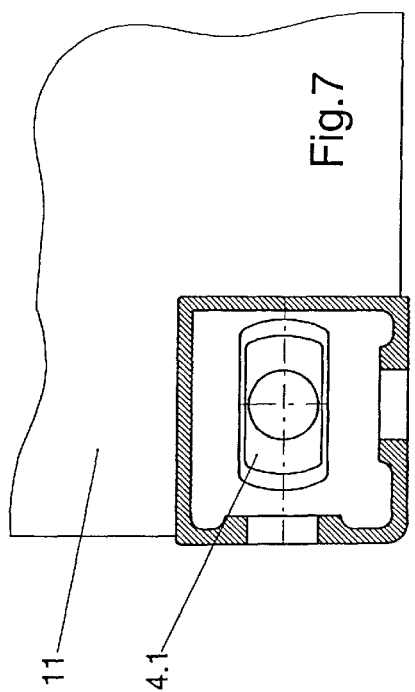

AUTOMATIC LOAD SECURING DEVICE FOR CONTAINERS, INTERCHANGEABLE CONTAINERS OR THE LIKE

BACKGROUND OF THE INVENTION

1. Field of the Invention

The invention is directed to a load securing device for standardized transport vessels, such as containers, interchangeable containers or the like, on loading surfaces. More specifically, the present invention is directed to securing containers by securing pins which are swivelable upward, around a horizontal swiveling axle, from a rest position under the loading surface arranged below the loading surface into their vertical working position and which are lockable in this position so as to be retained in openings in the corner regions of the containers for holding transported goods.

2. Description of the Related Art

A German reference DE-OS 19 06 826 discloses a generic fold-in rotational locking arrangement for containers positioned on a vehicle. The disclosed standardized construction can be used together with the same frame carrier currently in use on transport vehicles. As a result of the horizontal folding of the rotational lock described therein along with all add-on parts in the housing below the loading surface, the rotational locking arrangement in this state does not project beyond the carrier profile of the existing vehicle frame either in the upward or downward direction. In the disclosed solution, the rotational locking arrangement is actuated manually by swivel levers or handles as is also the case in locking devices of different constructions.

Of increasing importance in modern goods transportation is the reduction of loading and unloading times for container transport vehicles and the extensive restriction of manual operation by automating the loading process. Since the loading time required for transport vehicles represents unproductive time, the goal is to dispense with the manual operation and use of auxiliary personnel entirely.

There have already been sufficient suggestions, some of which have also been realized, for achieving the goal of automatic loading and unloading of container vehicles. However, there are presently no known automatically operated load securing devices for retaining the load on the loading surface of transport vehicles.

SUMMARY OF THE INVENTION

It is an object of the present invention to provide an automatic load securing device for standardized transport vessels such as containers, interchangeable containers or the like on loading surfaces of transport vehicles which can be activated by remote control and which can also be locked automatically.

Proceeding from the manual solution described above, this object is met according to the invention with a swivel bearing plate, acting as a lever, swivably connected to a swivel axle. A securing pin is fastened to the swivel bearing plate at a distance laterally from the swivel axle. In addition, a locking pin is guided in a lockable manner on the swivel bearing plate so as to be displaceable transversely to the swivel axle and parallel to the longitudinal axis of the swivel bearing plate, this locking pin being displaceable by an actuator which operates to swivel the swivel bearing plate between its working position and rest position and also operates the locking pin, thereby locking the swivel bearing plate.

The load securing device according to the invention performs the following functions in a fully automatic manner:

1. lowering of the load securing pin to the rest position,
2. loading the load securing pin into its working position; and
3. locking of the load securing pin at the working position.

The full lowering of the load securing device to the rest position is necessary particularly when containers of different sizes are to be transported on one and the same loading surface. For example, if two 20 ft ISO containers are transported on one loading surface, securing pins in appropriately predetermined spacing, corresponding the depressions in the two 20 ft ISO containers, are required. If a 40 ft ISO container is transported on the same loading surface, the same securing pins can not be used. That is, other securing pins have to be used corresponding to the depressions on the bottom of the 40 ft ISO container. It must be possible to remove the securing pins which are not in use from the plane of the loading surface so that the load can lie flat on the loading surface over the securing pins which are not in use. It must also be possible to carry this out automatically in an automated loading process to minimize the loading and unloading times for containers. The automatic loading process is made possible by the device and steps indicated by the invention.

In an embodiment of the present invention, the actuator is a piston-cylinder unit, arranged parallel to the locking pin when the locking pin is in the working position, to generate a moment about the swivel axle of the swivel bearing plate. The piston-cylinder unit is connected at one end to the swivel bearing plate. The other end of the piston-cylinder unit is connected to the frame, under the loading surface.

When the piston-cylinder unit is actuated, the securing pin swivels out of its rest position into the working position and back. It is ensured subsequently that the securing pin is retained in its working position by engagement of the locking pin with a lock on the frame. Accordingly, the securing pin is capable of absorbing both horizontal and vertical forces which act on the load securing device. The piston-cylinder unit itself is relieved of these forces once the bearing plate is locked in the working position.

In a further embodiment of the invention, the locking pin, arranged on the underside of the swivel plate remote of the securing pin, receives a pressure spring coaxially. The pressure spring is supported at one end by the locking pin and at the other end at the swivel bearing plate. The spring urges the locking pin away from the lock.

The spring is dimensioned that the weight moment of the swivel bearing plate around the swivel axle can be compensated in the working position of the securing pin. That is, when the piston-cylinder unit swivels the swivel bearing plate, the relative positions of the spring, the locking pin, and the swivel bearing plate are not affected.

In an advantageous manner, the spring effect ensures that the weight of the swivel bearing plate is compensated by the securing pin in the working position of the load securing pin. The locking and unlocking of the locking pin is effected at different times than the swiveling of the swivel bearing plate.

The present invention provides a simple automatable load securing device for ISO containers, interchangeable containers and the like which can be used especially when using driverless, self-driven transport units (STE). In contrast to conventional goods transport, where each one of the manually operated load securing devices on transport vehicles, such as freight cars, is individually actuated by the personnel accompanying the transport, it is now possible, as a result of the present invention, to activate the load securing device specific to the container automatically (e.g., by remote control). The present invention provides an intelligent link between transporting technology and railway technology, wherein it is possible to retrofit conventional freight cars with the present invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals delineate similar elements throughout the several views:

FIG. 6 shows the load securing device of FIG. 5 in the locked state; and

FIG. 7 shows a top view of the load securing device of FIG. 6.

DESCRIPTION OF THE PRESENTLY PREFERRED EMBODIMENTS

Figure 1:
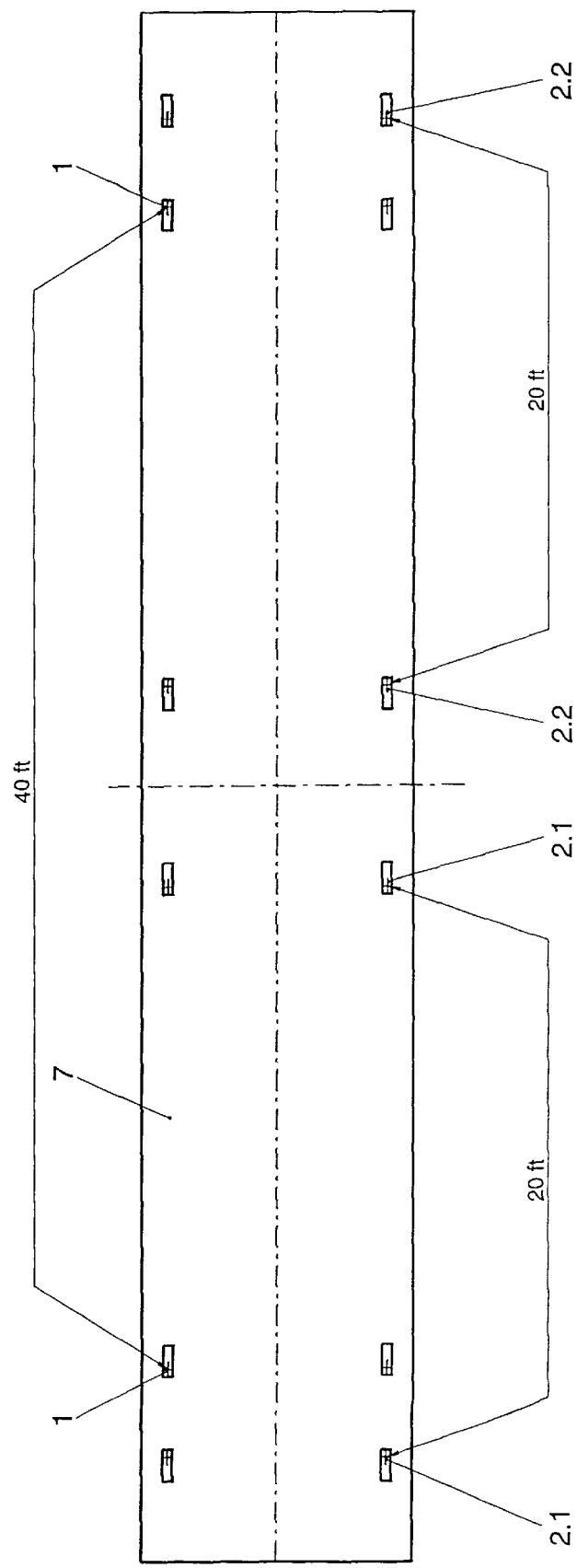
FIG. 1 shows a top view of the loading surface of a transporting device.

Referring to FIG. 1, a loading surface plane 7 of a transporting device for 20 ft and 40 ft ISO containers and for interchangeable containers requires twelve fastening points 1, 2.1, 2.2 for securing a load. Depending upon the type and size of the load, different fastening points 1, 2.1, 2.2 of a load securing device (not shown in FIG. 1) are activated. In the top half of FIG. 1, two of the four fastening points required for securing the load of a 40 ft ISO container are designated by 1. In the lower half of the drawing, four fastening points for two 20 ft ISO containers are designated by 2.1 and 2.2. In both cases, the oppositely located fastening points 1, 2.1, 2.2 are required in a mirror-inverted manner with respect to the longitudinal axis of loading surface 7.

Figure 2:
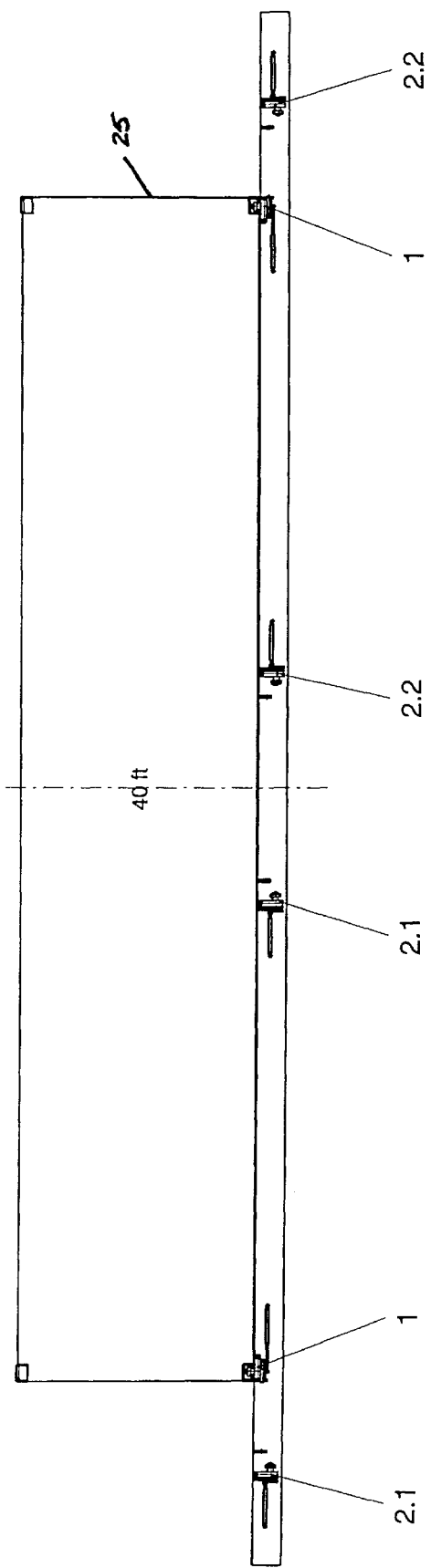
FIG. 2 shows a side view of the loading surface of FIG. 1 with a 40 ft ISO container.

Referring now to FIG. 2, fastening points 1 are activated for a 40 ft ISO container 25, while points 2.1 and 2.2 are deactivated. At least the middle ones of fastening points 1, 2.1, 2.2 are designed such that no structural component parts of load securing device projects out over loading surface plane 7 when 40 ft ISO container 25 is placed thereon.

Figure 3:
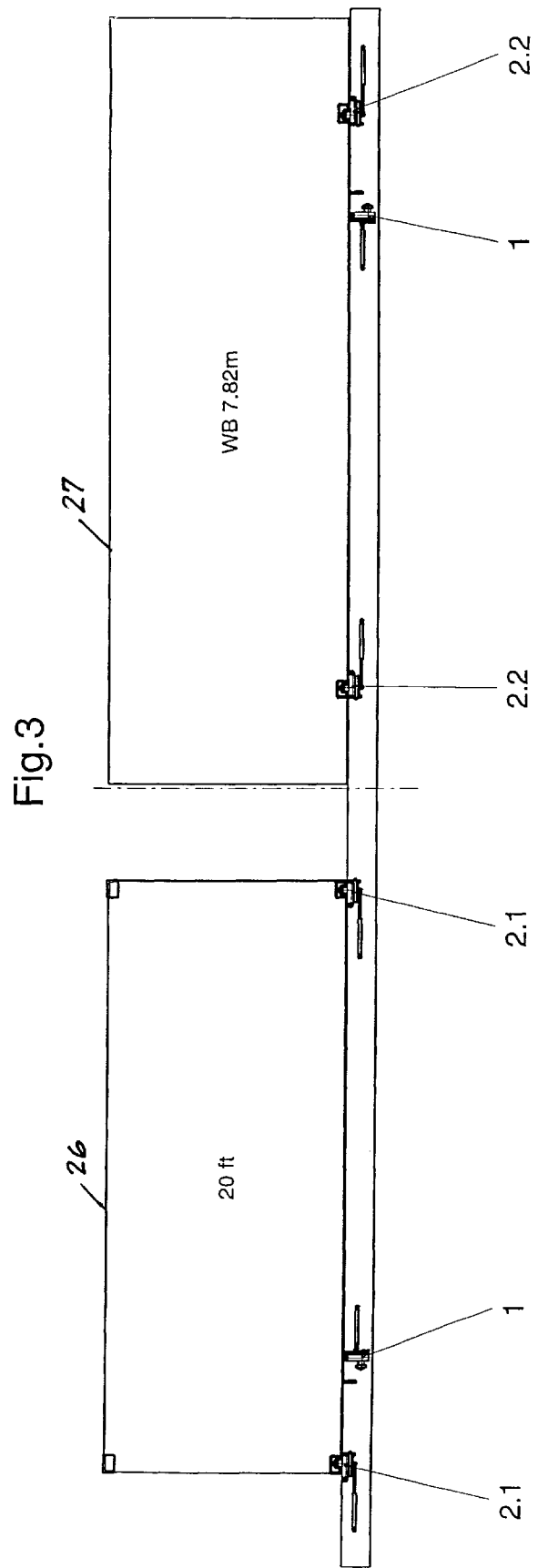
FIG. 3 shows a side view of the loading surface of FIG. 1 with a 20 ft ISO container and an interchangeable container.

FIG. 3 shows the transport of a 20 ft ISO container 26 and a 7.82 m interchangeable container 27. 20 ft ISO container 26 requires fastening points 2.1 for the load securing device, whereas fastening point 1 is deactivated. Interchangeable container 27 uses fastening points 2.2, while fastening point 1 is likewise deactivated.

Figure 4:
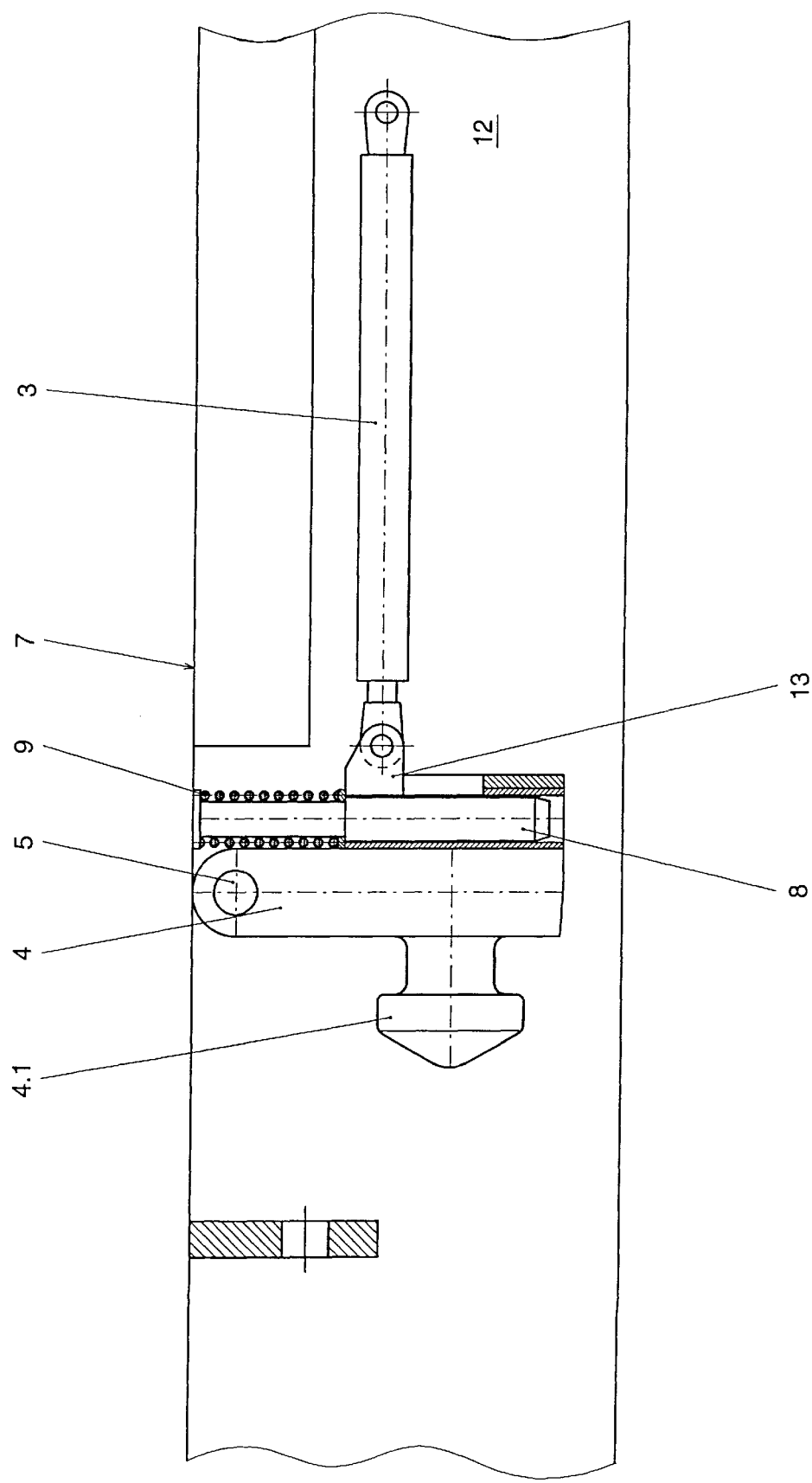
FIG. 4 shows the load securing device of the present invention in the rest position.

Referring now to FIG. 4, a securing pin 4.1 is arranged, according to the invention, on a swivel bearing plate 4 swivels downward about a swivel axle 5 such that securing pin 4.1 rests below loading surface plane 7. A piston-cylinder unit 3 is provided for swiveling of the swivel bearing plate 4. One side of piston-cylinder unit 3 connects to frame 12 and the other side connects to an articulated lever 13. Articulated lever 13 is fixedly connected to a locking pin 8. Locking pin 8 is slidably connected to swivel bearing plate 4 such that locking pin 8 is slidable traversely to swivel axle 5.

Figure 5:
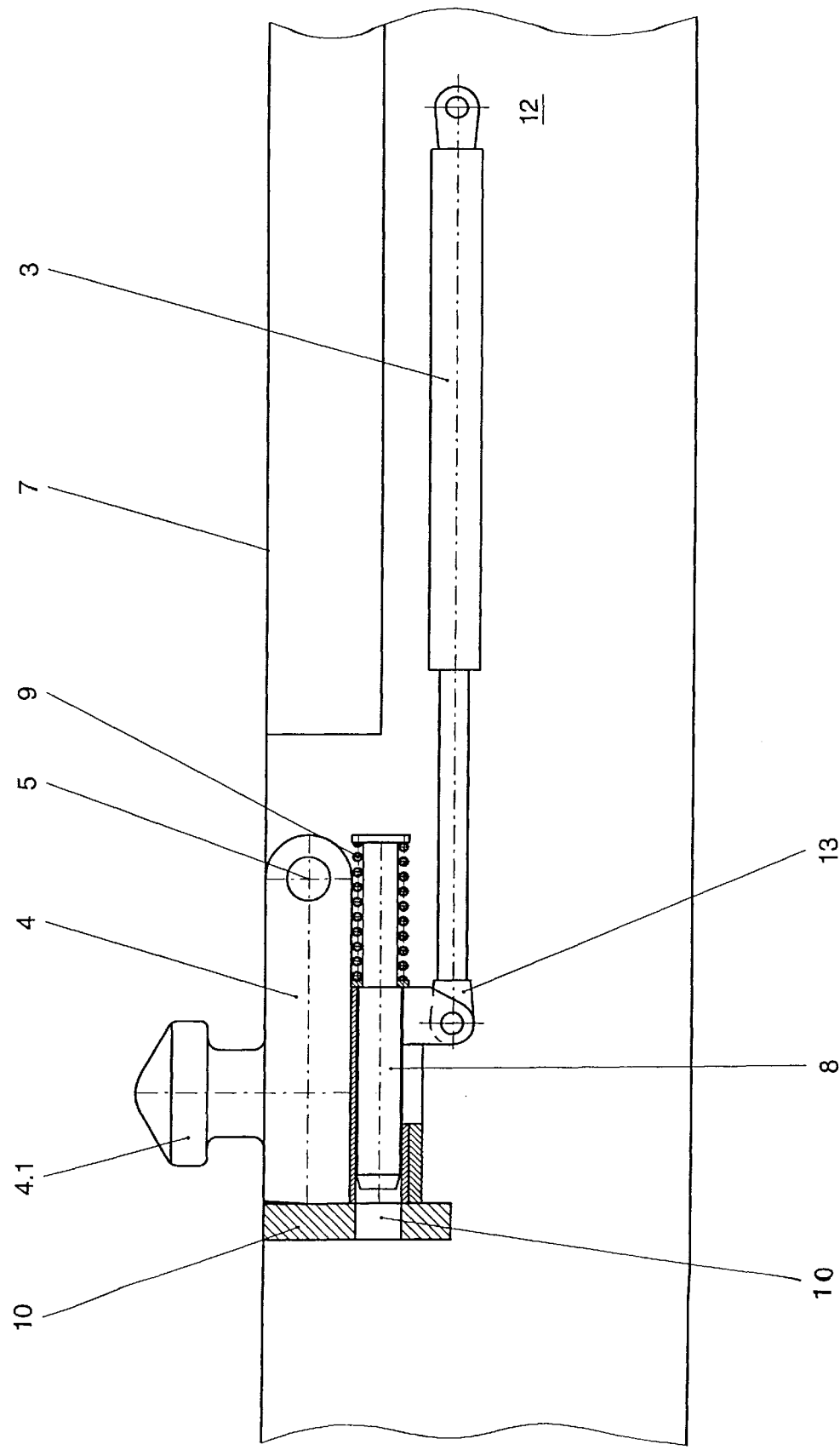
FIG. 5 shows the load securing device of the present invention in the working position in the unlocked state.

When piston-cylinder unit 3 is extended, swivel bearing plate 4 swivels about the swivel axle 5. The piston-cylinder unit 3 first brings about the upward movement of the swivel bearing plate 4. FIG. 5 shows securing pin 4.1 in the working position. After securing pin 4.1 reaches the working position, piston-cylinder unit 3 moves out farther causing securing pin 8 to be displaced (toward the left as viewed in the drawing plane) until it is fixed in a lock 10. In this working position of the load securing device, securing pin 4.1 is oriented vertically as is shown in FIG. 6. In this position, a container 11 lying on loading surface plane 7 is retained by securing pin 4.1. Securing pin 4.1 itself is secured by locking pin 8 which safely absorbs the forces acting in the horizontal and vertical directions.

Referring to FIGS. 4–6, locking pin 8 is lengthened on its side remote from piston-cylinder unit 3. locking pin 8 receives a coaxial pressure spring 9 which is supported by a collar on the end region of locking pin 8 on one side and by the portion of swivel bearing plate 4 which supports locking pin 8 on the other side. In the locking position of locking pin 8, coaxial pressure spring 9 is compressed. In this manner, locking pin 8 must be drawn back out of lock 10 as piston-cylinder unit 3 moves before the swiveling movement of swivel bearing plate 4 about the swivel axle 5 is initiated, to move swivel bearing plate back to the rest position.

FIG. 7 shows a horizontal section through the load securing device according to FIG. 6 in the region of the corner of the load 11.

The invention is not limited by the embodiments described above which are presented as examples only but can be modified in various ways within the scope of protection defined by the appended patent claims.

We claim:

1. A load securing device for transport vessels on a loading surface supported by a frame, comprising:

a swivel axle connected to the frame of the loading surface;

a lever swivelably connected about said swivel axle;

a securing pin fixedly connected to said lever at a lateral distance from said swivel axle;

said lever being swivelable between a rest position, whereat said lever and said securing pin are below said loading surface, and a working position whereat said securing pin projects above said loading surface corresponding to a position of an opening in the bottom of said transport vessel;

an actuator connected between said lever and the frame, said actuator being remotely actuatable to swivel said lever between said rest position and said working position;

a locking pin slidably connected to said lever, said locking pin being slidable in a direction transverse to said swivel axle;

a lock mounted on the frame;

said locking pin being slidable into a hole in said lock when said lever is in said working position, thereby securing said lever and said securing pin at said working position; and said actuator being connected to said locking pin, wherein said actuator is operable to slide said locking pin into said hole in said lock after said lever has been moved to said working position.

2. The load securing device of claim 1, further comprising:

a spring coaxially mounted on said locking pin, said spring being held between a flange at one end of said locking pin and a portion of said lever in which said locking pin is slidably mounted;

a strength of said spring is such that said locking pin is not moved relative to said lever during movement of said lever from said rest position to said working position.

3. The load securing device of claim 2, wherein said actuator comprises a piston-cylinder unit.

4. A load securing device for transport vessels on a loading surface supported by a frame, comprising:

a first plurality of load securing mechanisms mounted on the frame at positions corresponding to openings on a bottom of a first type of the transport vessels;

a second plurality of load securing mechanisms mounted on the frame at positions corresponding to openings on a bottom of a second type of the transport vessels;

each one of said first plurality of load securing mechanisms and said second plurality of load securing mechanisms including:

a swivel axle connected to the frame of the loading surface;

a lever swivelably connected about said swivel axle;

a securing pin fixedly connected to said lever at a lateral distance from said swivel axle;

said lever being swivelable about said swivel axis between a rest position, whereat said lever and said securing pin are below the loading surface, and a working position whereat said securing pin projects above the loading surface;

an actuator connected between said lever and the frame, said actuator being remotely actuatable to swivel said lever between said rest position and said working position;

a locking pin slidably connected to said lever, said locking pin being slidable in a direction transverse to said swivel axle;

a lock mounted on the frame;

said locking pin being slidable into a hole in said lock when said lever is in said working position to secure said lever and said securing pin at said working position; and said actuator being connected to said locking pin, wherein said actuator is operable to slide said locking pin into said hole in said lock after said lever has been moved to said working position;

said first plurality of load securing mechanisms and said second plurality of load securing mechanisms being independently actuatable such that when the transport vessel on said loading platform is the first type, said first plurality of load securing mechanisms are moved to said working position and said second plurality of load securing mechanisms remain in said rest position and when the transport vessel on the loading platform is the second type, said second plurality of load securing mechanisms are moved to said working position and said first plurality of load securing mechanisms remain in said rest position.

5. The load securing device of claim 4, wherein each one of said first plurality of load securing mechanisms and said second plurality of load securing mechanisms further comprises:

a spring coaxially mounted on said locking pin, said spring being held between a flange at one end of said locking pin and a portion of said lever in which said locking pin is slidably mounted;

a strength of said spring is such that said locking pin is not moved relative to said lever during movement of said lever from said rest position to said working position.

6. The load securing device of claim 5, wherein said actuator comprises a piston-cylinder unit.

* * * * *